(12) United States Patent
Yasuda et al.

(10) Patent No.: US 9,923,641 B2
(45) Date of Patent: Mar. 20, 2018

(54) SIGNAL PROCESSING DEVICE, OPTICAL COMMUNICATION SYSTEM, AND SIGNAL PROCESSING METHOD

(71) Applicant: NEC Corporation, Minato-ku, Tokyo (JP)

(72) Inventors: Wakako Yasuda, Tokyo (JP); Junichi Abe, Tokyo (JP); Daisaku Ogasahara, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/779,135

(22) PCT Filed: Sep. 19, 2013

(86) PCT No.: PCT/JP2013/075231
§ 371 (c)(1),
(2) Date: Sep. 22, 2015

(87) PCT Pub. No.: WO2014/155775
PCT Pub. Date: Oct. 2, 2014

(65) Prior Publication Data
US 2016/0050025 A1 Feb. 18, 2016

(30) Foreign Application Priority Data

Mar. 27, 2013 (JP) .................. 2013-066866

(51) Int. Cl.
*H04B 10/61* (2013.01)
*H04B 10/2513* (2013.01)

(52) U.S. Cl.
CPC ..... *H04B 10/6161* (2013.01); *H04B 10/2513* (2013.01); *H04B 10/613* (2013.01);
(Continued)

(58) Field of Classification Search
CPC ..... H04B 10/61–10/64; H04B 10/2507; H04B 10/2513–10/25133;
(Continued)

(56) References Cited

U.S. PATENT DOCUMENTS

2009/0175629 A1* 7/2009 Liu ............... H04B 10/25133
398/147
2010/0003028 A1* 1/2010 Zhang ............... H04B 10/61
398/65
(Continued)

FOREIGN PATENT DOCUMENTS

JP 2010-226254 A 10/2010
JP 2011-009956 A 1/2011
(Continued)

OTHER PUBLICATIONS

Liang B. Du and Arthur J. Lowery, "Improved single channel backpropagation for intra-channel fiber nonlinearity compensation in long-haul optical communication systems", Optics Express, vol. 18, No. 16, pp. 17075, Aug. 2, 2010.
(Continued)

*Primary Examiner* — David Payne
*Assistant Examiner* — Casey Kretzer (57) ABSTRACT

An optical receiver (20) includes an electrical signal generation unit (200), a first phase compensation unit (101), a distortion compensation unit (102), and a first dispersion compensation unit (400). The electrical signal generation unit (200) generates an electrical signal on the basis of received signal light. The first phase compensation unit (101) performs a phase rotation compensation process on the electrical signal generated by the electrical signal generation unit (200). The distortion compensation unit (102) performs a dispersion compensation process and a phase rotation compensation process in this order, at least once, on the electrical signal after having compensation performed
(Continued)

thereon by the first phase compensation unit. The electrical signal generation unit (200), the first phase compensation unit (101), and the distortion compensation unit (102) are incorporated into one semiconductor device.

5 Claims, 9 Drawing Sheets

(52) U.S. Cl.
CPC ....... *H04B 10/614* (2013.01); *H04B 10/6163* (2013.01); *H04B 10/6165* (2013.01)

(58) Field of Classification Search
CPC .................... H04B 2210/25–2210/254; H04B 10/2519–10/2531; H04B 10/6161; H04J 14/06
See application file for complete search history.

(56) References Cited

U.S. PATENT DOCUMENTS

| | | | |
|---|---|---|---|
| 2010/0046961 A1* | 2/2010 | Tanimura | H03F 3/08 398/159 |
| 2010/0329697 A1* | 12/2010 | Koizumi | H03J 7/26 398/208 |
| 2011/0176815 A1* | 7/2011 | Frankel | H04B 10/5053 398/184 |
| 2011/0255879 A1* | 10/2011 | Xie | H04B 10/2513 398/208 |
| 2011/0305464 A1* | 12/2011 | Goldfarb | H04B 10/50597 398/208 |
| 2012/0213532 A1* | 8/2012 | Hironishi | H04B 10/6165 398/208 |
| 2013/0070785 A1* | 3/2013 | Liu | C02F 1/78 370/464 |
| 2014/0023360 A1* | 1/2014 | Iizuka | H04B 10/2507 398/25 |

FOREIGN PATENT DOCUMENTS

| | | |
|---|---|---|
| JP | 2012-175581 A | 9/2012 |
| JP | 2012-227606 A | 11/2012 |
| JP | 2013-526152 A | 6/2013 |
| WO | 2011/130193 A1 | 10/2011 |

OTHER PUBLICATIONS

Weizhen Yan et al., "Low Complexity Digital Perturbation Back-Propagation", Proc. Conf. ECOC Tu.3.A.2, 2011.

International Search Report for PCT Application No. PCT/JP2013/075231, dated Nov. 12, 2013.

Japanese Office Action for JP Application No. 2015-507931 dated Jun. 27, 2017 with English Translation.

* cited by examiner

SIGNAL PROCESSING DEVICE, OPTICAL COMMUNICATION SYSTEM, AND SIGNAL PROCESSING METHOD

This application is a National Stage Entry of PCT/JP2013/075231 filed on Sep. 19, 2013, which claims priority from Japanese Patent Application 2013-066866 filed on Mar. 27, 2013, the contents of all of which are incorporated herein by reference, in their entirety.

TECHNICAL FIELD

The present invention relates to a signal processing device and a signal processing method which are used in optical communication.

BACKGROUND ART

The amount of data communicated has increased with the spread of the Internet. In order to cope with this trend, it is necessary to increase the capacity of a transmission channel. One of techniques for realizing an increase in capacity includes a quadrature amplitude modulation (QAM) system. Optical signals on which modulation of a QAM system is performed in a transmitter are demodulated in an optical receiver of a digital coherent system.

In optical communication of a QAM system, there is a large problem of a non-linear effect which is received when the optical signal propagates through a transmission channel. When the optical signal receives a non-linear effect in the transmission channel, the phase of the optical signal is rotated. Since the QAM system deals with complicated phase information, the reception of phase rotation due to a non-linear effect causes correct phase information not to be capable of being demodulated at the time of reception of the signal.

A method of solving such a problem includes a non-linear compensation system called back propagation. Such a compensation system is a system for compensating for waveform distortion while retracing propagation waveform from a receiving side to a transmitting side by performing dispersion compensation little by little and performing non-linear compensation immediately after each dispersion compensation.

However, in the back propagation, when one non-linear compensation stage is configured by combining a dispersion compensation function and a non-linear compensation function, it is necessary to increase the number of non-linear compensation stages in order to increase compensation capability. The dispersion compensation function is realized by a linear distortion compensation circuit, and the non-linear compensation function is realized by a non-linear distortion compensation circuit. The linear distortion compensation circuit includes an FFT/IFFT circuit in order to perform dispersion compensation in a frequency domain. The FFT/IFFT circuit has a large circuit size, and thus considering the mounting area or power consumption of an LSI, only several FFT/IFFT circuits can be mounted in one signal processing device.

On the other hand, Non-Patent Document 1 discloses a compensation system called filtered back propagation. Filtered back propagation is for reducing the number of non-linear compensation stages by using a time-averaged amount of the amount of phase rotation, calculated from signal strength, in non-linear compensation.

In addition, Non-Patent Document 2 discloses perturbation back propagation as a system for further reducing the number of non-linear compensation stages. In perturbation back propagation, even phase rotation caused by a perturbative component is canceled out in addition to the canceling out of phase rotation caused by the above-mentioned signal strength, thereby allowing the number of non-linear compensation stages to be reduced to, for example, three.

RELATED DOCUMENTS

Non-Patent Documents

[Non-Patent Document 1] Liang B. Du and Arthur J. Lowery, "Improved single channel backpropagation for intra-channel fiber nonlinearity compensation in long-haul optical communication systems", OPTICS EXPRESS, Vol. 18, No. 16, pp 17075, 2010

[Non-Patent Document 2] Weizhen Yan et al., "Low Complexity Digital Perturbation Back-Propagation", Proc. Conf. ECOC Tu.3.A.2, 2011

SUMMARY OF THE INVENTION

A circuit that converts a received optical signal into an electrical signal is generally incorporated into a semiconductor device. For this reason, a reduction in the size of a circuit that processes a signal is important in order to suppress an increase in the size of the semiconductor device.

Since filtered back propagation can reduce the number of non-linear compensation stages, it is possible to suppress an increase in the size of the semiconductor device. However, more than a certain number of non-linear compensation stages is required for increasing the accuracy of a signal. The inventors have examined a reduction in the size of the semiconductor device without reducing the number of non-linear compensation stages.

An object of the present invention is to provide a signal processing device and an optical communication system which are capable of reducing the size of a semiconductor device without reducing the number of non-linear compensation stages.

According to the present invention, there is provided a signal processing device including: an electrical signal generation unit that generates an electrical signal on the basis of signal light on which polarization multiplexing and quadrature amplitude modulation are performed and which is transmitted through a transmission channel; a first phase compensation unit that performs a phase rotation compensation process on the electrical signal; and a distortion compensation unit that performs a dispersion compensation process and a phase rotation compensation process in this order, at least once, on the electrical signal after having compensation performed thereon by the first phase compensation unit.

According to the present invention, there is provided an optical communication system including: an optical transmitter that transmits an optical signal; and an optical receiver that receives the optical signal through a transmission channel, wherein the optical transmitter includes an optical signal generation unit that generates the optical signal by performing polarization multiplexing and quadrature amplitude modulation on light, one of the optical transmitter and the optical receiver includes a first dispersion compensation unit that performs dispersion compensation on the signal light using an optical method, and the optical receiver includes an electrical signal generation unit that generates an electrical signal on the basis of the signal light after having compensation performed thereon by the first dispersion compensation unit, a first phase compensation unit that performs a phase rotation compensation process on the electrical signal, and at least one distortion compensation unit that a dispersion compensation process and a phase rotation compensation process in this order, on the electrical signal after having compensation performed thereon by the first phase compensation unit.

According to the present invention, there is provided an optical communication system including: an optical transmitter that transmits an optical signal; and an optical receiver that receives the optical signal through a transmission channel, wherein the optical transmitter includes a first dispersion compensation unit that performs a dispersion compensation process on a signal before being converted into the optical signal, and an optical signal generation unit that generates the optical signal by modulating light using the signal after having compensation performed thereon by the first dispersion compensation unit, and the optical receiver includes an electrical signal generation unit that generates an electrical signal on the basis of the signal light, a first phase compensation unit that performs a phase rotation compensation process on the electrical signal, and a distortion compensation unit that a dispersion compensation process and a phase rotation compensation process in this order, at least once, on the electrical signal after having compensation performed thereon by the first phase compensation unit.

According to the present invention, there is provided a signal processing method including: a step of receiving signal light on which polarization multiplexing and quadrature amplitude modulation is performed, through a transmission channel; a step of generating an electrical signal on the basis of the signal light; a step of performing a phase rotation compensation process on the electrical signal; and a step of performing a dispersion compensation process and a phase rotation compensation process in this order, on the electrical signal after having compensation performed thereon by the first phase compensation unit, wherein before the step of generating the electrical signal, a portion of an amount of dispersion of the signal light in the transmission channel is compensated for.

According to the present invention, it is possible to reduce the size of a semiconductor device without reducing the number of non-linear compensation stages.

BRIEF DESCRIPTION OF THE DRAWINGS

The above-mentioned objects, other objects, features and advantages will be made clearer from the preferred exemplary embodiments described below, and the following accompanying drawings.

DESCRIPTION OF EXEMPLARY EMBODIMENTS

Hereinafter, exemplary embodiments of the present invention will be described with reference to the accompanying drawings. In all the drawings, like elements are referenced by like reference numerals and the descriptions thereof will not be repeated.

First Exemplary Embodiment

Figure 1:
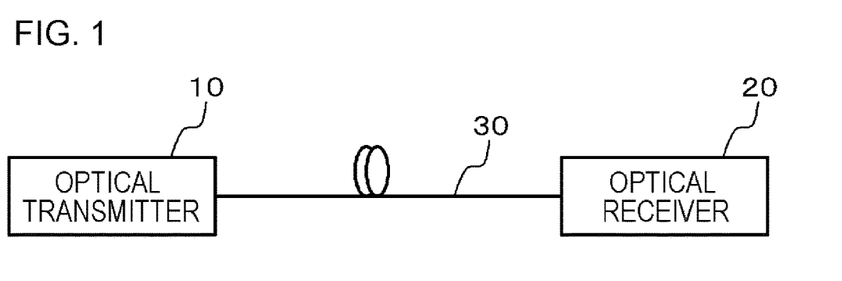
FIG. 1 is a diagram illustrating a configuration of an optical communication system according to a first exemplary embodiment.

FIG. 1 is a diagram illustrating a configuration of an optical communication system according to a first exemplary embodiment. The optical communication system according to the present exemplary embodiment includes an optical transmitter 10 and an optical receiver 20. The optical transmitter 10 and the optical receiver 20 are connected to each other through a transmission channel 30. The transmission channel 30 is configured using an optical fiber or the like. This optical communication system is, for example, a system in which communication is performed in a QAM (Quadrature Amplitude Modulation) system.

The optical transmitter 10 modulates and multiplexes light using a plurality of signals to be transmitted, to thereby generate a polarization-multiplexed optical signal. The generated optical signal is transmitted to the optical receiver 20 through the transmission channel 30. The optical receiver 20 demodulates the received optical signal. The optical signal receives a linear effect (dispersion effect) and a non-linear effect during propagation through the transmission channel 30. The optical receiver 20 also performs a process for compensating for these effects.

Figure 2:
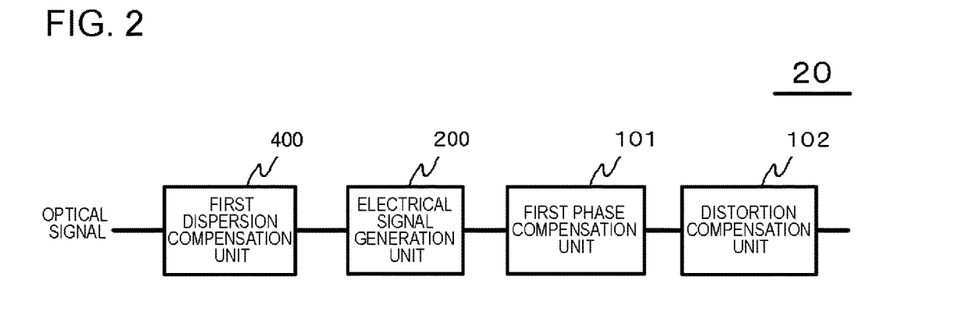
FIG. 2 is a diagram illustrating an example of a functional configuration of an optical receiver.

FIG. 2 is a diagram illustrating an example of a functional configuration of the optical receiver 20. The optical receiver 20 includes an electrical signal generation unit 200, a first phase compensation unit 101, a distortion compensation unit 102, and a first dispersion compensation unit 400. The electrical signal generation unit 200 generates an electrical signal on the basis of received signal light. The first phase compensation unit 101 performs a phase rotation compensation process on the electrical signal generated by the electrical signal generation unit 200. The distortion compensation unit 102 performs a dispersion compensation process and a phase rotation compensation process in this order, at least once, on the electrical signal after having compensation performed thereon by the first phase compensation unit. The electrical signal generation unit 200, the first phase compensation unit 101, and the distortion compensation unit 102 are incorporated into one semiconductor device.

The optical receiver 20 further includes the first dispersion compensation unit 400. The first dispersion compensation unit 400 performs dispersion compensation on the signal light transmitted from the optical transmitter 10, using an optical method. The electrical signal generation unit 200 generates an electrical signal on the basis of the signal light after dispersion compensation is performed thereon by the first dispersion compensation unit 400.

In addition, the sum of the amount of dispersion compensation performed by the distortion compensation unit 102 and the amount of dispersion compensation performed by the first dispersion compensation unit 400 is equal to the amount of dispersion received by the signal light in the transmission channel 30. For this, the amount of dispersion received by the signal light in the transmission channel 30 may be measured or calculated, and the amount of dispersion compensation in the first phase compensation unit 101 and the amount of dispersion compensation performed by the first dispersion compensation unit 400 may be set so as to become equal to the above amount of dispersion.

As described above, according to the present exemplary embodiment, a first non-linear compensation stage is constituted by the first dispersion compensation unit 400 and the first phase compensation unit 101. Second and subsequent non-linear compensation stages are constituted by the distortion compensation unit 102. Therefore, an electrical circuit required for constituting a plurality of non-linear compensation stages becomes smaller by one dispersion compensation unit. Therefore, it is possible to reduce the size of a circuit which is incorporated into a semiconductor device, and to, as a result, reduce the size of the semiconductor device. In other words, it is possible to increase the number of non-linear compensation stages without increasing the size of the semiconductor device.

Second Exemplary Embodiment

An optical communication system according to the present exemplary embodiment has the same configuration as that of the optical communication system according to the first exemplary embodiment, except for the configuration of an optical receiver 20.

Figure 3:
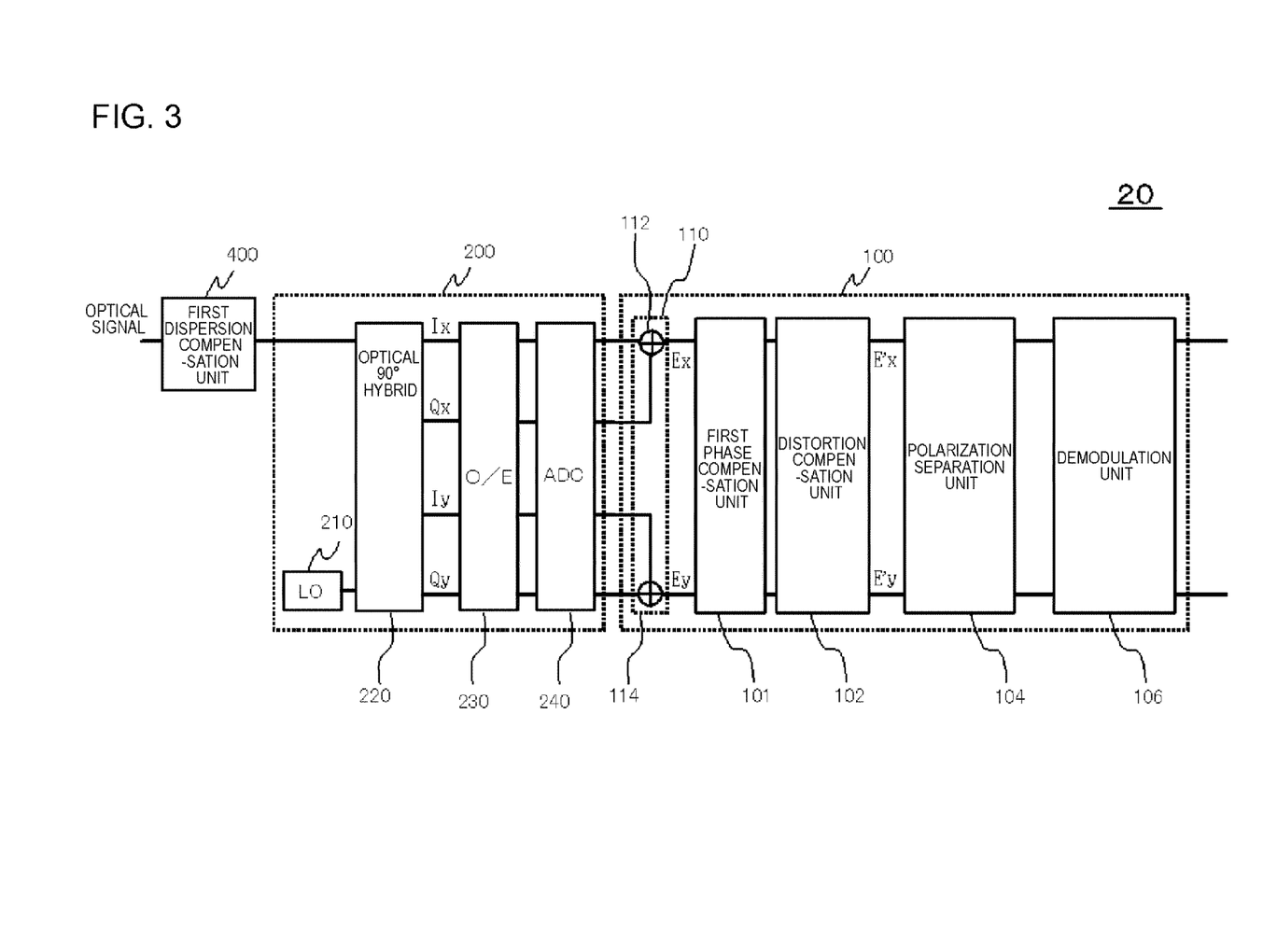
FIG. 3 is a diagram illustrating a functional configuration of an optical receiver according to the present exemplary embodiment.

FIG. 3 is a diagram illustrating a functional configuration of an optical receiver 20 according to the present exemplary embodiment. The optical receiver 20 includes a first dispersion compensation unit 400, a local light source (LO) 210, an optical 90° hybrid 220 (interference unit), a photoelectric (O/E) conversion unit 230, an AD (analog-digital) conversion unit (ADC) 240, and a signal processing unit 100. The signal processing unit 100 is constituted by one semiconductor device.

As is the case with the first exemplary embodiment, the first dispersion compensation unit 400 performs dispersion compensation on signal light transmitted from the optical transmitter 10, using an optical method.

The signal light after dispersion compensation is performed thereon by the first dispersion compensation unit 400 and local light from the local light source 210 are input to the optical 90° hybrid 220. The optical 90° hybrid 220 generates a first optical signal ($I_x$) by causing the optical signal and the local light to interfere with each other at a phase difference 0, and generates a second optical signal ($Q_x$) by causing the optical signal and the local light to interfere with each other at a phase difference π/2. In addition, the optical 90° hybrid 220 generates a third optical signal ($I_y$) by causing the optical signal and the local light to interfere with each other at a phase difference 0, and generates a fourth optical signal ($Q_y$) by causing the optical signal and the local light to interfere with each other at a phase difference π/2. The first optical signal and the second optical signal form a set of signals, and the third optical signal and the fourth optical signal also form a set of signals.

The photoelectric conversion unit 230 photoelectrically converts the four optical signals (output lights) generated by the optical 90° hybrid 220, and generates four analog signals.

The AD conversion unit 240 converts (quantizes) the four analog signals generated by the photoelectric conversion unit 230 into digital signals, respectively.

The signal processing unit 100 processes the four digital signals generated by the AD conversion unit 240, to thereby generate demodulated signals obtained by demodulating the optical signals. Specifically, the signal processing unit 100 includes a polarized signal generation unit 110, a first phase compensation unit 101, a distortion compensation unit 102, a polarization separation unit 104, and a demodulation unit 106.

The polarized signal generation unit 110 includes addition units 112 and 114. The addition unit 112 adds a digital signal generated from the first optical signal ($I_x$) to a digital signal generated from the second optical signal ($Q_x$), to thereby generate a first polarized signal ($E_x$). The addition unit 114 adds a digital signal generated from the third optical signal ($I_y$) to a digital signal generated from the fourth optical signal ($Q_y$), to thereby generate a second polarized signal ($E_y$). Specifically, $E_x$ and $E_y$ accord to the following Expressions (1) and (2).

[Math 1]

$$E_x = I_x + jQ_x \qquad (1)$$

[Math 2]

$$E_y = I_y + jQ_y \qquad (2)$$

The first phase compensation unit 101 performs phase compensation on the first polarized signal ($E_x$) and the second polarized signal ($E_y$). The distortion compensation unit 102 performs a process for compensating for a linear effect and a non-linear effect which are received when the optical signals propagate through the transmission channel 30. The details of the first phase compensation unit 101 and the distortion compensation unit 102 will be described later.

The polarization separation unit 104 performs a filter arithmetic operation for each polarized wave. The demodulation unit 106 demodulates a signal transmitted by compensating for a frequency difference and a phase difference between the optical signal and the local light.

Figure 4:
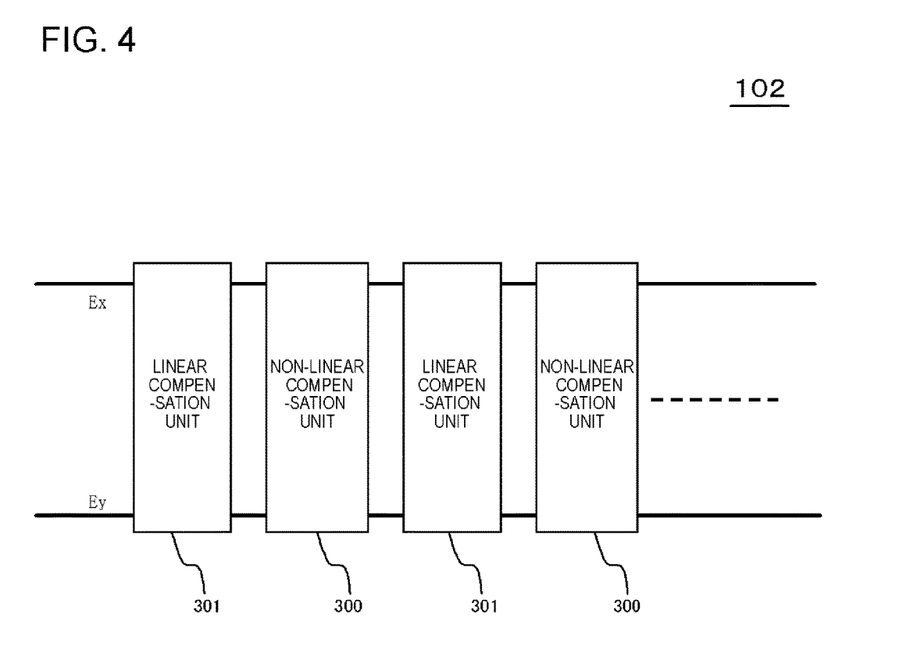
FIG. 4 is a diagram illustrating a functional configuration of a distortion compensation unit.

FIG. 4 is a diagram illustrating a functional configuration of the distortion compensation unit 102. The distortion compensation unit 102 includes at least one processing stage constituted by a linear compensation unit 301 and a non-linear compensation unit 300. Meanwhile, when the number of processing stages is small (for example, equal to or less than 5), it is preferable that the final stage of the distortion compensation unit 102 is the linear compensation unit 301 (second dispersion compensation unit). However, when the number of processing stages is, for example, equal to or greater than 10, the final stage of the distortion compensation unit 102 may not be the linear compensation unit 301.

Meanwhile, in any of cases where the final stage of the distortion compensation unit 102 is the linear compensation unit 301 and the final stage thereof is the non-linear compensation unit 300, the sum of the amount of dispersion compensation performed by the linear compensation unit 301 included in the distortion compensation unit 102 and the amount of dispersion compensation performed by the first dispersion compensation unit 400 is equal to the amount of dispersion received by the signal light in the transmission channel 30.

The linear compensation unit 301 compensates for a linear effect received by the optical signal in the transmission channel 30. The linear compensation unit 301 includes, for example, an FFT (Fast Fourier Transform) unit, a filtering unit, and an IFFT (Inverse Fast Fourier Transform) unit. The FFT unit performs an FFT arithmetic operation on an input signal. The filtering unit performs a filter arithmetic operation on a signal, using a filter coefficient for compensating for a dispersion effect received by the optical signal in the transmission channel. The IFFT unit performs an IFFT arithmetic operation on a filtered signal.

The non-linear compensation unit 300 compensates for a non-linear effect received by the optical signal in the transmission channel 30.

Figure 5:
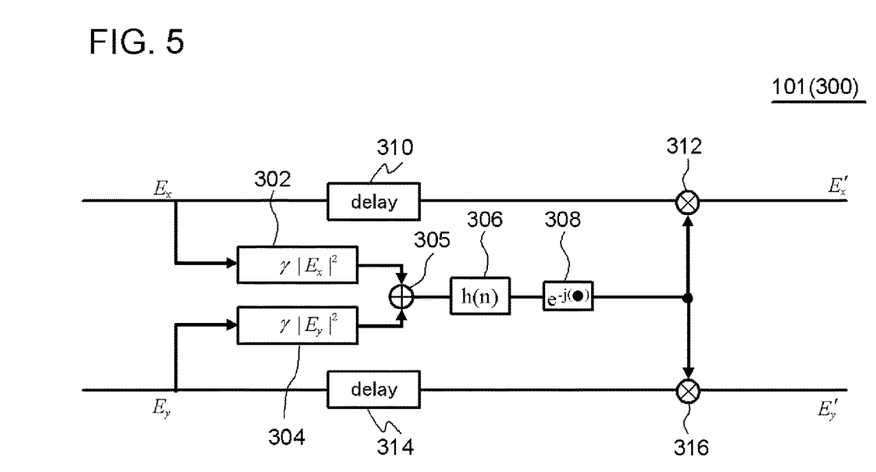
FIG. 5 is a diagram illustrating an example of a functional configuration of a first phase compensation unit.

FIG. 5 is a diagram illustrating an example of a functional configuration of the first phase compensation unit 101. Meanwhile, the functional configuration of the non-linear compensation unit 300 is also the same as the configuration shown in the drawing. In an example shown in the drawing, the first phase compensation unit 101 performs a compensation process according to filtered back propagation. However, the first phase compensation unit 101 may perform a process according to another system, for example, a process according to back propagation or perturbation back propagation.

The first phase compensation unit 101 includes strength calculation units 302 and 304, an addition unit 305, a filtering unit 306, a phase modulation unit 308, delay units 310 and 314, and multiplication units 312 and 316. The strength calculation unit 302 calculates the strength of a polarized signal $E_x$, and calculates the amount of phase rotation based on the strength. The strength calculation unit 304 calculates the strength of a polarized signal $E_y$, and calculates the amount of phase rotation based on the strength. The addition unit 305 adds the amount of phase rotation calculated by the strength calculation unit 302 to the amount of phase rotation calculated by the strength calculation unit 304. The filtering unit 306 multiplies the amount of phase rotation which is output by the addition unit 305 by a coefficient (h(n)) for time averaging. The phase modulation unit 308 calculates a coefficient for compensating for phase rotation by using the amount of phase rotation after being processed by the filtering unit 306. This coefficient is multiplied by the polarized signal $E_x$ after being delayed in the delay unit 310 by the multiplication unit 312, and is multiplied by the polarized signal $E_y$ after being delayed in the delay unit 314 by the multiplication unit 316. Meanwhile, the delay units 310 and 314 are provided in order to synchronize the polarized signals $E_x$ and $E_y$ with a coefficient calculation timing.

Meanwhile, the first phase compensation unit 101 shown in FIG. 5 performs a process according to the following Expressions (3) and (4).

[Math 3]

$$E'_x(k) = E_x(k)\exp\left[-j\sum_{m=0}^{n-1} h(n)\gamma(|E_x(k-m)|^2 + |E_y(k-m)|^2)\right] \quad (3)$$

[Math 4]

$$E'_y(k) = E_y(k)\exp\left[-j\sum_{m=0}^{n-1} h(n)\gamma(|E_x(k-m)|^2 + |E_y(k-m)|^2)\right] \quad (4)$$

Figure 6:
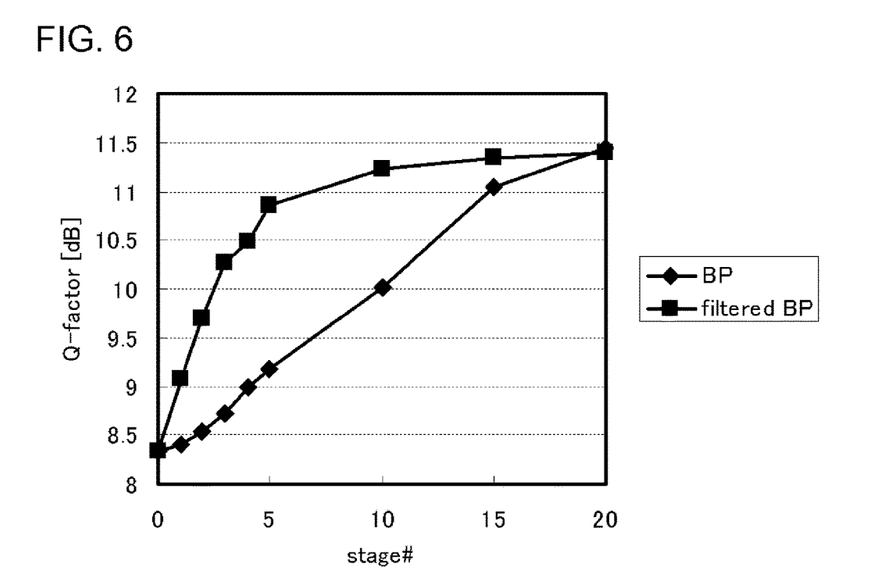
FIG. 6 is a diagram illustrating a relationship between the number of non-linear compensation stages and the amount of improvement of a transmission quality Q-factor.

FIG. 6 illustrates a relationship between the number of non-linear compensation stages and the amount of improvement of a transmission quality Q-factor. In the drawing, BP means back propagation, and FBP means filtered back propagation. As n becomes larger, the effect of the non-linear compensation increases. However, considering the mounting area or power consumption of the semiconductor device, it is preferable that the number of non-linear compensation stages is equal to or less than 5. In an example shown in FIG. 6, when the number of non-linear compensation stages is equal to or less than 5, the Q-factor improves in a linear function manner as n becomes larger. That is, it can be understood that the amount of improvement of the Q-factor changes greatly depending on the presence or absence of one non-linear compensation stage.

According to the present exemplary embodiment, for the same reason as that in the first exemplary embodiment, it is possible to increase the number of non-linear compensation stages without increasing the size of the semiconductor device.

Third Exemplary Embodiment

Figure 7:
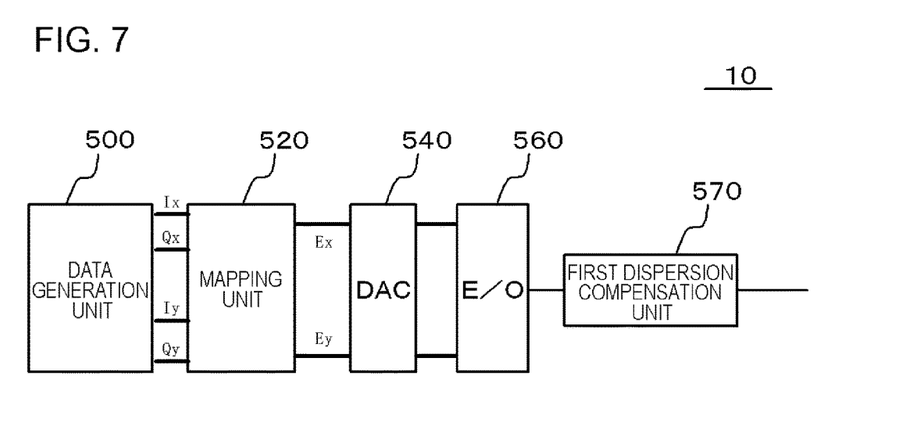
FIG. 7 is a diagram illustrating a functional configuration of an optical transmitter which is used in an optical communication system according to a third exemplary embodiment.
Figure 8:
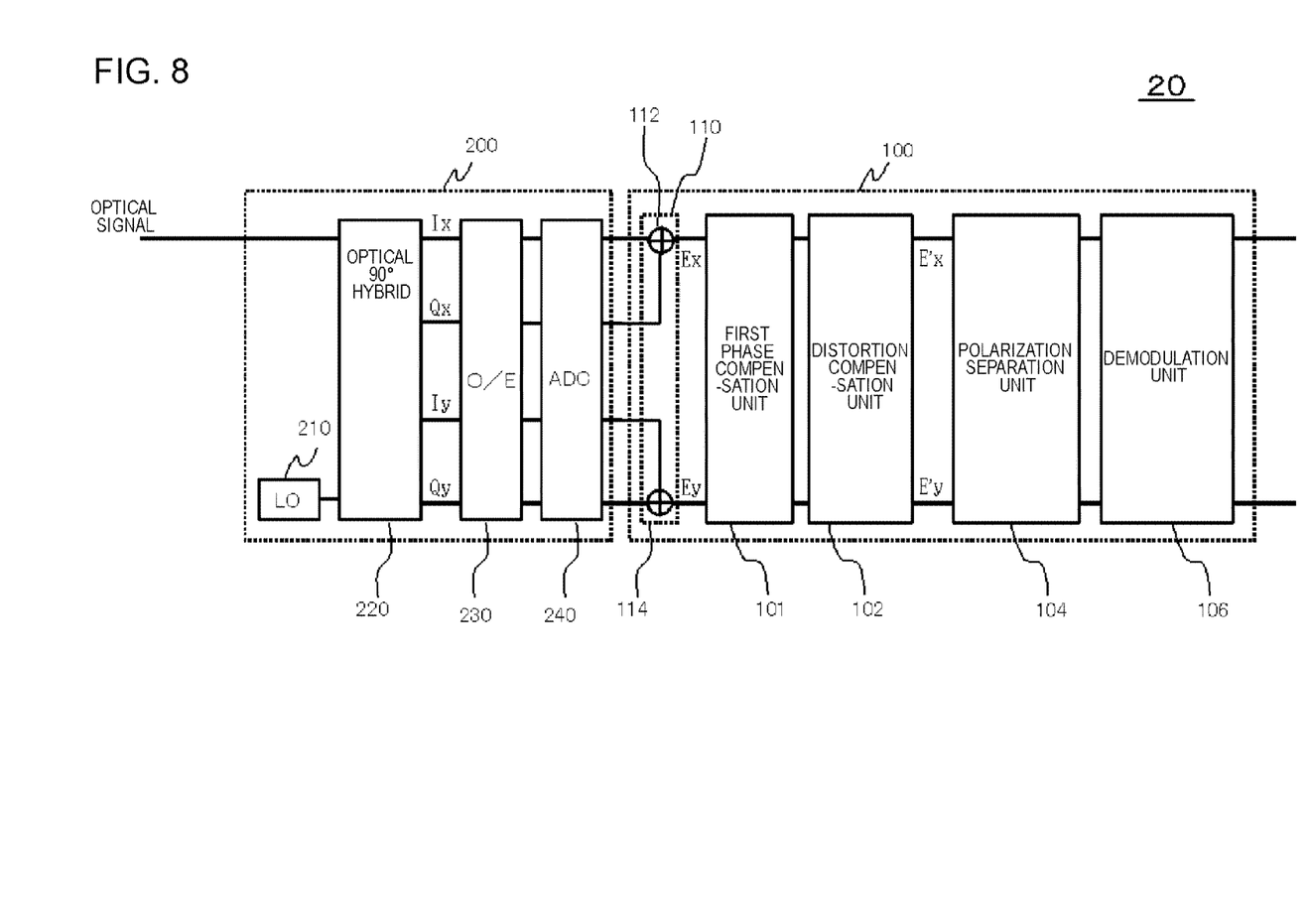
FIG. 8 is a diagram illustrating a functional configuration of an optical receiver.

FIG. 7 is a diagram illustrating a functional configuration of an optical transmitter 10 which is used in an optical communication system according to a third exemplary embodiment, and FIG. 8 is a diagram illustrating a functional configuration of an optical receiver 20 according to the present exemplary embodiment. The optical communication system according to the present exemplary embodiment has the same configuration as that of the optical communication system according to the second exemplary embodiment, except that the optical receiver 20 does not include the first dispersion compensation unit 400, and that the optical transmitter 10 instead includes a first dispersion compensation unit 570.

Specifically, the optical transmitter 10 includes a data generation unit 500, a mapping unit 520, a DA (digital-analog) conversion unit (DAC) 540, an electric-optic conversion (E/O) unit 560, and a first dispersion compensation unit 570. The data generation unit 500 generates a plurality of signals (multi-digit binary signals) to be transmitted. The mapping unit 520 performs a mapping process, and thus determines to which position in the constellation of a QAM signal the signal generated by the data generation unit 500 is allocated using a conversion table. Thereby, two polarized signals $E_x$ and $E_y$ having a plurality of signals allocated to multi-valued signals are generated.

The DA conversion unit 540 converts the two polarized signals $E_x$ and $E_y$ into analog signals. The electric-optic conversion unit 560 includes a laser light source, an optical modulator, and a polarization multiplexing unit, and modulates and performs polarization multiplexing on light which is output by the laser light source by two analog signals generated by the DA conversion unit 540, to thereby generate an optical signal to be transmitted. The first dispersion compensation unit 570 performs a process of compensating for a portion of dispersion received in the transmission channel 30, in advance, on the optical signal generated by the electric-optic conversion unit 560.

Meanwhile, in the present exemplary embodiment, the sum of the amount of dispersion compensation performed by the first dispersion compensation unit 570 and the amount of dispersion compensation performed by the distortion compensation unit 102 is also equal to the amount of dispersion which is received by the signal light in the transmission channel 30.

In the present exemplary embodiment, it is also possible to obtain the same effect as that in the second exemplary embodiment.

Fourth Exemplary Embodiment

An optical communication system according to the present exemplary embodiment has the same configuration as that of the optical communication system according to the third exemplary embodiment, except for the functional configuration of the optical transmitter 10.

Figure 9:
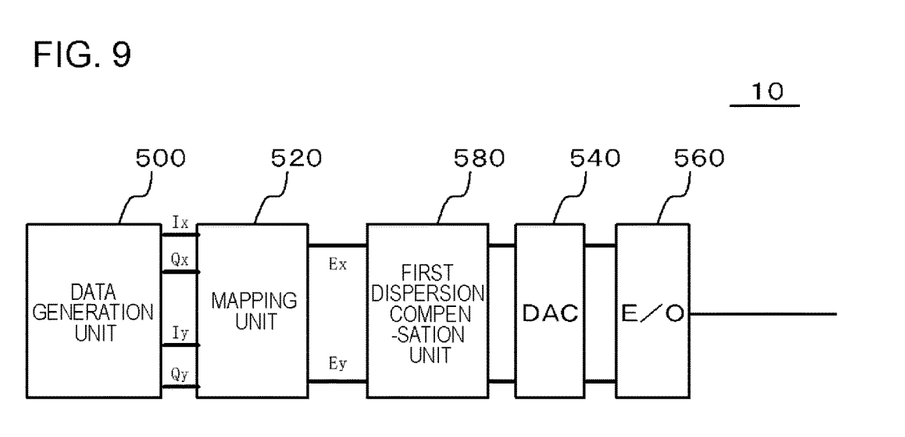
FIG. 9 is a diagram illustrating a functional configuration of an optical transmitter according to a fourth exemplary embodiment.

FIG. 9 is a diagram illustrating a functional configuration of an optical transmitter 10 according to the present exemplary embodiment. The optical transmitter 10 shown in the drawing includes a first dispersion compensation unit 580 instead of the first dispersion compensation unit 570 shown in FIG. 7, and performs dispersion compensation in a signal processing manner rather than in an optical manner. Specifically, the first dispersion compensation unit 580 performs a dispersion compensation process on the two polarized signals Ex and Ey which are output by the mapping unit 520. The DA conversion unit 540 converts two polarized signals after the first dispersion compensation unit 580 performs a dispersion process thereon into analog signals. The electric-optic conversion unit 560 modulates light using the two analog signals generated by the DA conversion unit 540, and generates signal light.

In the present exemplary embodiment, it is also possible to obtain the same effect as that in the second exemplary embodiment.

As described above, although the exemplary embodiments of the present invention have been set forth with reference to the accompanying drawings, the exemplary embodiments are merely illustrative of the present invention, and various configurations other than those stated above can be adopted.

Hereinafter, examples of reference forms are appended.

1. A signal processing device including:
an electrical signal generation unit that generates an electrical signal on the basis of signal light on which polarization multiplexing and quadrature amplitude modulation are performed and which is transmitted through a transmission channel;
a first phase compensation unit that performs a phase rotation compensation process on the electrical signal; and
a distortion compensation unit that performs a dispersion compensation process and a phase rotation compensation process in this order, at least once, on the electrical signal after having compensation performed thereon by the first phase compensation unit.

2. The signal processing device according to 1, further including a first dispersion compensation unit that performs dispersion compensation on the signal light using an optical method,
wherein the electrical signal generation unit generates the electrical signal on the basis of the signal light after having compensation performed thereon by the first dispersion compensation unit.

3. The signal processing device according to 1 or 2, wherein a sum of an amount of dispersion compensation performed by the distortion compensation unit and an amount of dispersion compensation performed by the first dispersion compensation unit is equal to an amount of dispersion which is received by the signal light in the transmission channel.

4. The signal processing device according to any one of 1 to 3, wherein the electrical signal generation unit includes:

an interference unit that generates four pieces of output light by causing the signal light after having compensation performed thereon by the first phase compensation unit and local light to interfere with each other;
a photoelectric conversion unit that photoelectrically converts the four pieces of output light to generate four analog signals;
an analog-digital conversion unit that converts the four analog signals into four digital signals; and
a polarized signal generation unit that generates two polarized signals corresponding to two polarization components of the signal light, as the electrical signal, from the four digital signals.

5. The signal processing device according to 1, 2, or 4, further including a second dispersion compensation unit, provided after the distortion compensation unit of a final stage, which performs a dispersion compensation process on the electrical signal.

6. The signal processing device according to 5, wherein a sum of the amount of dispersion compensation performed by the distortion compensation unit, the amount of dispersion compensation performed by the first dispersion compensation unit, and an amount of dispersion compensation performed by the second dispersion compensation unit is equal to the amount of dispersion which is received by the signal light in the transmission channel.

7. An optical communication system including:
an optical transmitter that transmits an optical signal; and
an optical receiver that receives the optical signal through a transmission channel,
wherein the optical transmitter includes an optical signal generation unit that generates the optical signal by performing polarization multiplexing and quadrature amplitude modulation on light,
one of the optical transmitter and the optical receiver includes a first dispersion compensation unit that performs dispersion compensation on the signal light using an optical method, and
the optical receiver includes
an electrical signal generation unit that generates an electrical signal on the basis of the signal light after having compensation performed thereon by the first dispersion compensation unit,
a first phase compensation unit that performs a phase rotation compensation process on the electrical signal, and
at least one distortion compensation unit that performs a dispersion compensation process and a phase rotation compensation process in this order, on the electrical signal after having compensation performed thereon by the first phase compensation unit.

8. An optical communication system including:
an optical transmitter that transmits an optical signal; and
an optical receiver that receives the optical signal through a transmission channel,
wherein the optical transmitter includes
a first dispersion compensation unit that performs a dispersion compensation process on a signal before being converted into the optical signal, and
an optical signal generation unit that generates the optical signal by modulating light using the signal after having compensation performed thereon by the first dispersion compensation unit, and
the optical receiver includes
an electrical signal generation unit that generates an electrical signal on the basis of the signal light,
a first phase compensation unit that performs a phase rotation compensation process on the electrical signal, and at least one distortion compensation unit that performs a dispersion compensation process and a phase rotation compensation process in this order, on the electrical signal after having compensation performed thereon by the first phase compensation unit.

9. The optical communication system according to 7 or 8, wherein a sum of an amount of dispersion compensation performed by the distortion compensation unit and an amount of dispersion compensation performed by the first dispersion compensation unit is equal to an amount of dispersion which is received by the signal light in the transmission channel.

10. The optical communication system according to any one of 7 to 9, wherein the electrical signal generation unit includes:
an interference unit that generates four pieces of output light by causing the signal light after having compensation performed thereon by the first phase compensation unit and local light to interfere with each other;
a photoelectric conversion unit that photoelectrically converts the four pieces of output light to generate four analog signals;
an analog-digital conversion unit that converts the four analog signals into four digital signals; and
a polarized signal generation unit that generates two polarized signals corresponding to two polarization components of the signal light, as the electrical signal, from the four digital signals.

11. The optical communication system according to 7, 8, or 10, wherein the optical receiver includes a second dispersion compensation unit, provided after the distortion compensation unit of a final stage, which performs a dispersion compensation process on the electrical signal.

12. The optical communication system according to 11, wherein a sum of the amount of dispersion compensation performed by the distortion compensation unit, the amount of dispersion compensation performed by the first dispersion compensation unit, and an amount of dispersion compensation performed by the second dispersion compensation unit is equal to the amount of dispersion which is received by the signal light in the transmission channel.

13. A signal processing method including:
a step of receiving signal light on which polarization multiplexing and quadrature amplitude modulation is performed, through a transmission channel;
a step of generating an electrical signal on the basis of the signal light;
a step of performing a phase rotation compensation process on the electrical signal; and
a step of performing a dispersion compensation process and a phase rotation compensation process in this order, on the electrical signal after having compensation performed thereon by the first phase compensation unit,
wherein before the step of generating the electrical signal, a portion of an amount of dispersion of the signal light in the transmission channel is compensated for.

This application claims priority from Japanese Patent Application No. 2013-066866 filed on Mar. 27, 2013, the content of which is incorporated herein by reference in its entirety.

What is claimed is:
1. A signal processing device comprising:
a first dispersion compensation unit that is implemented by an optical device and that is configured to perform dispersion compensation, using an optical method, on signal light on which polarization multiplexing and quadrature amplitude modulation are performed and which is transmitted through a transmission channel,
an electrical signal generation unit that is implemented by an optoelectrical/photoelectric device and that is configured to generate an electrical signal based on the signal light;
a first non-linear compensation unit that is implemented by the optoelectrical/photoelectric device and that is configured to perform a phase rotation compensation process on the electrical signal; and
a distortion compensation unit that is implemented by the optoelectrical/photoelectric device and that is configured to perform a dispersion compensation process and a non-linear compensation process in this order, at least once, on the electrical signal after having compensation performed thereon by the first non-linear compensation unit;
wherein a sum of an amount of dispersion compensation performed by the first dispersion compensation unit and an amount of dispersion compensation performed by the distortion compensation unit is set to be equal to an amount of dispersion which is received by the signal light in the transmission channel and measured or calculated in advance.

2. The signal processing device according to claim 1, wherein the electrical signal generation unit includes:
an interference unit that is implemented by the optical device and that is configured to generate four pieces of output light by causing the signal light and local light to interfere with each other;
a photoelectric conversion unit that is implemented by the optoelectrical/photoelectric device and that is configured to photoelectrically convert the four pieces of output light to generate four analog signals;
an analog-digital conversion unit that is implemented by the optoelectrical/photoelectric device and that is configured to convert the four analog signals into four digital signals; and
a polarized signal generation unit that is implemented by the optoelectrical/photoelectric device and that is configured to generate two polarized signals corresponding to two polarization components of the signal light, as the electrical signal, from the four digital signals.

3. The signal processing device according to claim 1, wherein the distortion compensation unit is further configured to perform the dispersion compensation process and the non-linear compensation process in this order, at least once, and then to perform an additional dispersion compensation process.

4. An optical communication system comprising:
an optical transmitter configured to transmit an optical signal; and
an optical receiver configured to receive the optical signal through a transmission channel,
wherein the optical transmitter includes an optical signal generation unit that is implemented by a first optoelectrical device and that is configured to generate the optical signal by performing polarization multiplexing and quadrature amplitude modulation on light,
one of the optical transmitter and the optical receiver includes a first dispersion compensation unit that is implemented by an optical device and that is configured to perform dispersion compensation on the signal light using an optical method, and
the optical receiver includes:
an electrical signal generation unit that is implemented by a second optoelectrical device and that is configured to generate an electrical signal based on the signal light after having compensation performed thereon by the first dispersion compensation unit, a first non-linear compensation unit that is implemented by the second optoelectrical device and that is configured to perform a phase rotation compensation process on the electrical signal, and at least one distortion compensation unit that is implemented by the second optoelectrical device and that is configured to perform a dispersion compensation process and a non-linear compensation process in this order, on the electrical signal after having compensation performed thereon by the first non-linear compensation unit, wherein a sum of an amount of dispersion compensation performed by the first dispersion compensation unit and an amount of dispersion compensation performed by the at least one distortion compensation unit is set to be equal to an amount of dispersion which is received by the signal light in the transmission channel and measured or calculated in advance.

5. An optical communication system comprising:

an optical transmitter configured to transmit an optical signal; and an optical receiver configured to receive the optical signal through a transmission channel, wherein the optical transmitter includes:

a first dispersion compensation unit that is implemented by an electrical circuit and that is configured to perform a dispersion compensation process on a signal before being converted into the optical signal, and an optical signal generation unit that is implemented by a first optoelectrical device and that is configured to generate the optical signal by modulating light using the signal after having compensation performed thereon by the first dispersion compensation unit, and the optical receiver includes an electrical signal generation unit that is implemented by a second optoelectrical device and that is configured to generate an electrical signal based on the signal light, a first non-linear compensation unit that is implemented by the second optoelectrical device and that is configured to perform a phase rotation compensation process on the electrical signal, and at least one distortion compensation unit that is implemented by the second semiconductor device and that is configured to perform a dispersion compensation process and a non-linear compensation process in this order, on the electrical signal after having compensation performed thereon by the first non-linear compensation unit;

wherein a sum of an amount of dispersion compensation performed by the first dispersion compensation unit and an amount of dispersion compensation performed by the at least one distortion compensation unit is set to be equal to an amount of dispersion which is received by the signal light in the transmission channel and measured or calculated in advance.

* * * * *